United States Patent [19]

Badertscher et al.

[11] Patent Number: 5,824,266
[45] Date of Patent: Oct. 20, 1998

[54] APPARATUS FOR TREATING A FLUID PRODUCT BY INJECTION OF STEAM AND THE FLUID PRODUCT

[75] Inventors: Ernest Badertscher, Orbe; Paul-Henri Poget, Bretonnieres, both of Switzerland

[73] Assignee: Nestec S.A., Vevey, Switzerland

[21] Appl. No.: 822,442

[22] Filed: Mar. 21, 1997

[30] Foreign Application Priority Data

Dec. 4, 1996 [EP] European Pat. Off. ............ 96200988

[51] Int. Cl.$^6$ ........................................... A61L 2/08
[52] U.S. Cl. ...................... 422/26; 99/468; 99/483; 137/505; 422/112; 422/307; 426/511; 426/521
[58] Field of Search .................... 422/26, 108, 109, 422/110, 111, 112, 295, 307, 905; 73/271, 265; 137/505; 99/467, 468, 483, 516; 126/369; 426/506, 511, 520, 521

[56] References Cited

U.S. PATENT DOCUMENTS

| | | | |
|---|---|---|---|
| 4,810,856 | 3/1989 | Jovanovic | 219/401 |
| 5,395,569 | 3/1995 | Badertscher et al. | 261/62 |
| 5,469,781 | 11/1995 | Thom, Jr. | 99/516 |
| 5,523,053 | 6/1996 | Dudek | 422/26 |

FOREIGN PATENT DOCUMENTS

| | | |
|---|---|---|
| 221 415 | 5/1987 | European Pat. Off. |
| 475 284 B1 | 9/1991 | European Pat. Off. |
| 601 329 A1 | 6/1994 | European Pat. Off. |
| 1193549 | 7/1970 | United Kingdom. |
| 2 036 534 | 7/1980 | United Kingdom. |

*Primary Examiner*—Krisanne Thornton
*Attorney, Agent, or Firm*—Pennie & Edmonds

[57] ABSTRACT

An apparatus for treating a fluid product by injecting steam from a steam inlet and fluid product from a product inlet into a mixing chamber. The mixing chamber includes an outlet for the treated product, a steam injection opening with a first valve member disposed therein and a product injection opening with a second valve member disposed therein. The position of the first and second valve members determines the width of a substantially annular discharge orifice around each valve member. The discharge orifices face one another. The apparatus additionally includes pressure sensitive displacement means which permits movement of the second valve member in response to the pressure in the product inlet. The invention additionally relates to a method for treating a fluid product utilizing the apparatus as described above.

18 Claims, 1 Drawing Sheet

APPARATUS FOR TREATING A FLUID PRODUCT BY INJECTION OF STEAM AND THE FLUID PRODUCT

TECHNICAL FIELD

The present invention relates to an apparatus for treating a fluid such as for sterilizing and/or pasteurizing and/or homogenizing fluid products. More particularly, it relates to an apparatus for sterilizing, pasteurizing and/or homogenizing a fluid product by injection of steam and the fluid product.

BACKGROUND ART

Direct steam injection is used in the food industry for pasteurizing or sterilizing milk or cereal products. Various types of apparatus for pasteurizing or sterilizing fluid food products by injection of steam are known. Some are based on the principle of injecting steam into the product, while others are based on the principle of injecting the product into the steam or on the principle of injecting steam and product into a mixing chamber. The present invention relates to the latter type of apparatus.

Whereas direct steam injection does not raise particular problems for low viscosity fluids such as milk, whey and cream, the pasteurization of fluid products with far higher viscosity such as infant food with 20% starch is very difficult to control in a homogeneous mixing.

In the present context a fluid product is understood to be a solution or suspension, e.g. aqueous, having a viscosity of the order of 1 to 100,000 mPa.s.

An arrangement for treating a fluid product by injecting steam and the fluid product into a mixing chamber is known from Societe des Produits Nestlé S. A. European Patent Application 0 601 329. This arrangement comprises a T-shaped tubular body consisting of a tubular outlet arm and a straight tube comprising a steam injector and a product injector nozzle positioned in the straight tube opposite and with adjacent orifices.

In this T-shaped tubular body the product and the steam are mixed in a mixing zone between the orifice of the steam and the product injector and discharged through the tubular outlet.

Although this assembly has many advantages, it allows only a manual regulation of the size of the discharge orifice, and such a manual regulation is not sufficient to dampen fluctuations in the throughput as no instant regulation is possible. The regulation varies the quantity of product and the amount of steam corresponding thereto in a constant ratio; i.e. it is not possible to regulate the sizes of the discharge orifices independently. Furthermore, when treating a highly viscous product containing smaller lumps there is at least a temporary risk of blockage of the product injection which results in pressure fluctuation in the product and corresponding steam loss.

SUMMARY OF THE INVENTION

The present invention overcomes the above described drawbacks and provides an improved apparatus for treating a fluid product which minimizes the fluctuation of the pressure in the apparatus and gives a surprisingly stable production of a substantially equally heat treated product.

Accordingly, the invention provides an apparatus for treating a fluid product by injecting steam from a steam inlet and the fluid product from a product inlet into a mixing chamber mixing chamber comprises an outlet for the treated product, a steam injection opening with a first valve member disposed in said steam injection opening, a product injection opening with a second valve member disposed in the product injection opening, the position of said valve members determining the width of a substantially annular discharge orifice around each valve member, the discharge orifices facing one another, and pressure sensitive displacement means to permit movement of the second valve member in response to the pressure in the product inlet.

The present invention allows an instant adjustment of the size of the product injection opening during the operation of the apparatus and provides a direct response to the pressure in the product inlet. This instant regulation is important for processing viscous products with a high starch content in a stable manner.

If pressure fluctuations occur in the apparatus which affect the product flow, additional steam may have to be injected to ensure a sufficient heating of the product. The present invention aims to minimize such fluctuation of the product pressure and thus allow steam consumption to be reduced.

For viscous products, the liquid flux cannot be turbulent. However, by employing a sonic velocity of the steam obtained when the pressure upstream of the steam injection opening is at least double that in the mixing chamber, a very good mixing results. Sonic velocity of steam is about 450 m/sec. If the pressure upstream of the steam injection opening is 6 bars the pressure downstream should be 3 bars or less.

In the apparatus according to the invention, preferred mixing conditions, are present when the product velocity is from 1 to 20 m/sec while the steam velocity is sonic. With steam at sonic velocity, the steam quantity supplied to the mixing chamber remains stable even though the pressure in the mixing chamber fluctuates.

Variations in the product throughput at constant steam injection result in a temperature variation of the treated product due to the changed ratio of steam and product mixed and thus in an non-homogeneous heated product. It is preferred, therefore, that the apparatus according to the invention is provided with motion means for regulating the position of the first valve member in response to or in order to regulate the temperature of the treated product. During regulation the ratio between the upstream and the downstream pressure should however be kept to at least two so as to maintain the sonic velocity of the steam entering the mixing chamber. The motion means may e.g. comprise a motor driving a thread spindle engaging with a threaded part of the first valve member.

A regulation of the pressure in the mixing chamber, is obtained by means of a valve in the product outlet, e.g. an automatic discharge valve such as a membrane valve. The regulation of the pressure in the product inlet is made independently of the pressure in the outlet, with the only restriction that the pressure in the product inlet should be larger than that in the product outlet.

The apparatus according to the invention is also suitable for treating fluid products containing smaller lumps, due to the control of the product inlet pressure by the second valve member's position and quick displacement of the valve member. Such products are otherwise difficult to handle, as even a regional blockage results in undesirable steam bubbles, irregular product distribution, temperature and pressure variation in the product discharged from the apparatus, and steam loss.

Manual regulation of the position of valve members such as is known from the prior art or regulation by means of motors is not a sufficiently rapid regulation for the present purpose of regulating the supply of viscous product with a high starch content. Although such motors may react fast, the response may be due to the motor's inertia which may not be fast enough to compensate for pressure variations or temporary regional blockage of the product flow. It has been found that a surprisingly stable discharge product is obtained when the position of the second valve member is carried out by pressure sensitive displacement means which are able to instantly move the second valve member of the product injector nozzle. While the first valve member may be moved by motion means as described above.

In an advantageous embodiment of the invention a pressure sensitive displacement means comprises a pressure sensitive membrane responsive to the pressure in the product inlet an effect of which is a displacement of the injection nozzle's valve member. The valve member may advantageously be directly attached to the membrane. As the membrane is directly sensitive to pressure, the acting upon it results in an instant regulation. The resistance of the membrane can be adjusted by e.g. pneumatic regulation of the pressure in a pressure chamber on the side of the membrane being opposite to the product side. This allows for an individual regulation or adjustment of the initially desired position of the valve member, from which position the valve member is allowed to move in order to dampen fluctuation in the throughput's parameters and pressure variation in the product inlet, and hence prevent unnecessary steam consumption.

The apparatus according to the invention and the process discussed below are especially suitable for homogenizing milk-containing products and cereal-based porridge-like food products. High viscosity products with smaller lumps may advantageously be treated in accordance with the invention. High viscosity products may e.g. comprise over 20% starch.

The homogenizing effect is obtained by the shearing of the product which enters the sonic jet of steam transverse to the direction of the of the steam jet, preferably at a substantially right angle thereto. This homogenizing effect may be enforced with a tooth design on the part of the valve members which project into the mixing chamber. This provides a shock effect when the mixture hits upon the teeth. In the particular case of milk-containing products, a good homogenizing effect is obtained by in the apparatus as a result of the shearing of the fatty globules.

The apparatus conveniently comprises a tubular housing part acting respectively as steam and product inlet wherein the valve members are coaxially disposed. The tube is divided by a neck-in intersection which defines the injection openings which are aligned, and positioned opposite and adjacent to one another.

It is preferred that the inner surfaces of the inlets which are towards the injection openings, are conical shaped with a larger diameter upstream than downstream, and that the part of the valve members adjacent thereto are conical shaped with a larger diameter upstream rather than downstream. This decrease of diameter increases the velocity of the injected steam and fluid product. Advantageously, the conical surfaces of the inlets and the part of the valve member adjacent to said opening have an angle of substantially 45 degrees relative to the valve member's rotation axis so that the injected streams of the product and the steam meet at a substantially right angle. This provides the homogenizing and mixing effect as discussed above.

An appropriate flow through the mixing chamber is obtained when the outlet from the mixing chamber is through a central axial bore in one of the valve members, preferably in the first valve member. As mentioned above, the shape of the part of the valve members in the mixing chamber will also have an influence on the flow pattern therein. A shock effect is obtained with the special tooth design of the downstream end of the valve members which improves the homogenizing and the mixing of the product and the steam in the mixing chamber.

In order to optimize the flow of the fluid product through the apparatus, it further comprises a tube element having a cut-off providing the tube with one side being longer than the other one. The tube is disposed coaxially with the the steam injection openings, for improving the flow conditions from the steam inlet to the part of annular steam injection opening being furthest away from the inlet. By inserting such additional tube element, dead zones in the product injector nozzle may be also eliminated.

The steam injection nozzle is connected to a feed pipe feeding steam under pressure. The product injection nozzle is connected to a feed pipe feeding the fluid product to be treated. The outlet from the apparatus is connected to a tube preferably provided with a back-pressure valve.

In another aspect, the invention relates to a process for treating a fluid product by injecting steam from a steam inlet and the fluid product from a product inlet into a mixing chamber. This process comprises injecting steam through a steam injection opening in the mixing chamber in which steam injection opening a first valve member is disposed, injecting product through a product injection opening in the mixing chamber in which product injection opening a second valve member is disposed, the position of the valve members determining the size of a substantially annular discharge orifice around each valve member, the discharge orifices facing one another, while permitting movement of the second valve member in response to the pressure in the product inlet by means of pressure sensitive displacement means, and discharging the treated product through an outlet in the mixing chamber.

In the method the pressure in the mixing chamber may be regulated by means of an outlet back-pressure valve controlling the discharge, while the temperature of the treated product may be regulated by changing the size of the steam inlet opening.

BRIEF DESCRIPTION OF THE DRAWINGS

The invention will now be described in greater detail with reference to the accompanying drawing showing by way of example an embodiment of the apparatus and method according to invention and in which.

DETAILED DESCRIPTION OF THE PREFERRED EMBODIMENTS

Figure 1:
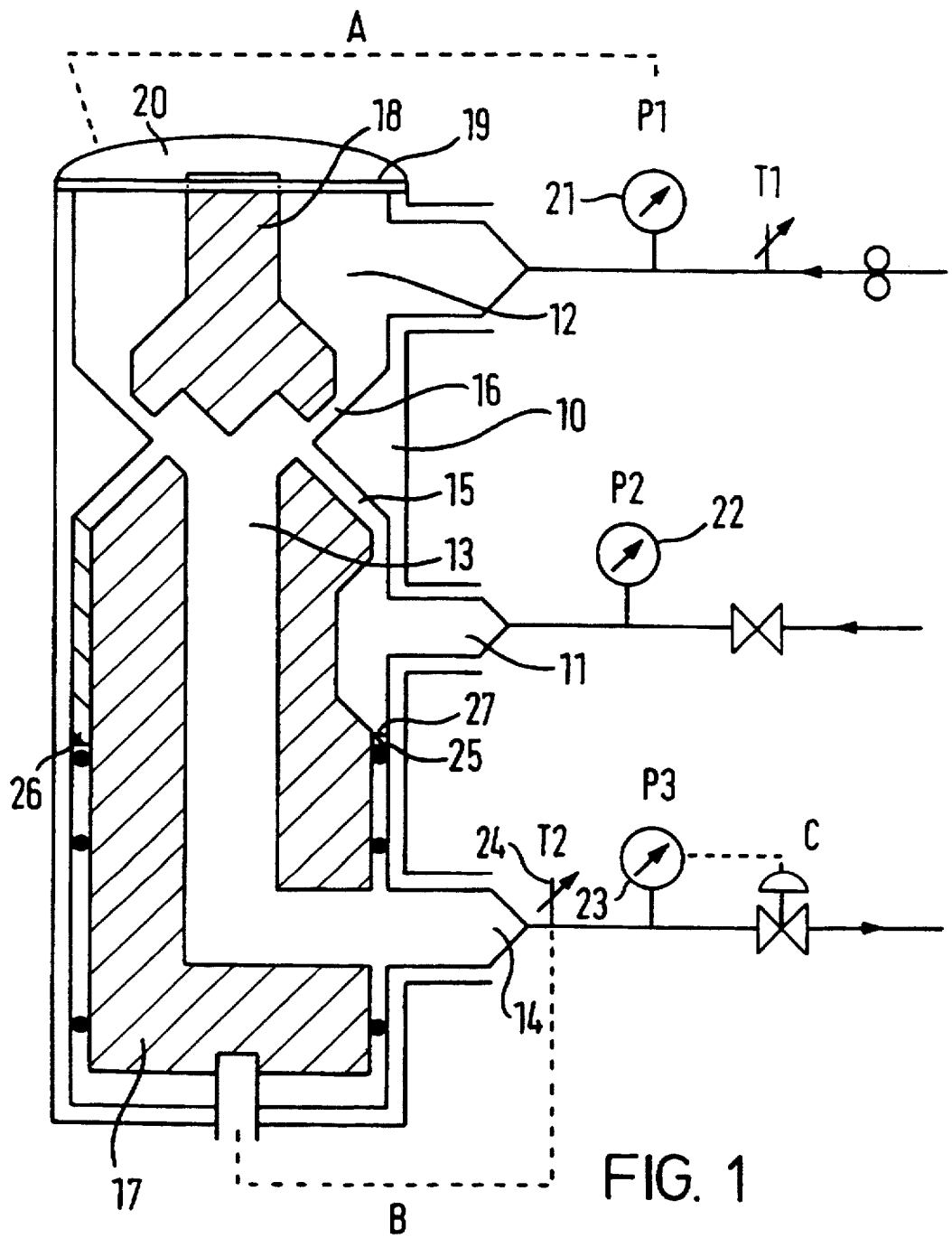
FIG. 1 is a schematic illustration of the principle elements of the apparatus according to the invention.

FIG. 1 shows an apparatus 10 according to the invention for treating a fluid product by injecting steam from a steam inlet 11 and the fluid product from a product inlet 12 into a mixing chamber 13. The product treated in the apparatus exits the apparatus through an outlet 14. The steam is supplied from the inlet 11 through a steam injection opening 15 into the mixing chamber 13. In said opening a first valve member 17 is disposed. Similarly, the product is introduced from the product inlet 12 through a product injection opening 16 into the mixing chamber 13. In said opening 16 a second valve member 18 is disposed. The position of the valve members 17 and 18 determine the width of a substantially annular discharge orifice around each valve member. The steam and product discharges are orifices facing one another.

The apparatus 10 further comprises pressure sensitive displacement means comprising a membrane 19. This membrane 19 is attached to the second valve member 18. The membrane is flexible. The stiffness of it can be regulated e.g. pneumatically by varying the pressure in a membrane chamber 20. The membrane will respond to the pressure in the product inlet 12 and displace the second valve member 18.

The first valve member 17 is connected to motion means comprising motor (not shown in the drawings) e.g. running a threaded shaft 28 engaging with the valve member. By means of the motor the valve member may be displaced for the regulation of the temperature in the treated product while the process is running.

Pressure and temperature are detected by sensors 21, 22, 23, and 24.

Both valve members 17 and 18 may be moved into a position wherein the injection openings 15 and 16 are closed due to contact between wall part defining the outer part of the inlets 11 and 12 and the valve members 17 and 18. In this position no product or steam are allowed to pass through the apparatus 10.

The steam inlet 11 is be connected to a feed pipe for supplying steam under pressure and the product inlet 12 is be connected to a feed pipe for supplying the fluid product to be treated under pressure. The outlet 14 is preferably connected to a pipe by a back-pressure valve. Control of back pressure is important for preventing loss of steam and an uneconomic production.

In order to provide a steam injection with a substantially constant pressure along the whole periphery of the annular discharge orifice, the apparatus is provided with a tube element 25 having a cut-off end providing the tube element with one side 26 being longer than on other side 27. This tube is disposed coaxially with the said steam injection opening 15 for improving the flow from the steam inlet to the part of the annular discharge orifice furthest away from the steam inlet.

The discharge from mixing chamber in this embodiment of the invention is through a central and axial bore in the first valve members 17.

In the apparatus and the process the following regulation circuits are used:
(A) Regulation of the pressure in the product inlet while keeping $P_1 > P_2$. The regulation is independent of (C) by the pressure displacement means (19,20).
(B) Regulation of temperature of the treated product $T_2$ by the motion means (motor) while keeping $P_2 \geq 2P_3$.
(C) Regulation of pressure in the mixing chamber 13 and outlet 14 by means of an automatic discharge valve or a membrane valve. The regulation is independent to (A) and (B).

The invention improves process control which allows steam to be saved and provides a stable throughput. This is obtained by connecting the inner valve member or members to driver means i.e. the motion means and pressure sensitive displacement means described above, and thus a desirable combined instant and-fast automatic regulation of the size of the discharge orifices is obtained. This regulation allows each of the injection openings to be varied independently.

What is claimed is:

1. An apparatus for steam treating a fluid product, said apparatus comprising:
   a steam inlet adapted for injecting steam into a mixing chamber;
   a product inlet adapted for injecting a fluid product into said mixing chamber; and
   a mixing chamber, said mixing chamber comprising an outlet for treated product;
   a steam injection opening with a first valve member disposed therein;
   a product injection opening with a second valve member disposed therein, the position of said first and said second valve members determining the width of a substantially annular discharge orifice around each said valve member, said discharge orifices facing one another; and
   pressure sensitive displacement means operatively associated with said second valve member to permit movement of said second valve member in response to pressure in the product inlet.

2. The apparatus according to claim 1, wherein the apparatus further comprises motion means to move the first valve member for the regulation of the temperature of the treated product.

3. The apparatus according to claim 1, wherein the outlet is provided with a valve for the regulation of the pressure in the mixing chamber.

4. The apparatus according to claim 1, wherein the pressure sensitive displacement means comprises a pressure sensitive membrane responsive to the pressure in the mixing chamber or product inlet.

5. The apparatus according to claim 4, wherein the second valve member is attached to said pressure sensitive membrane.

6. The apparatus according to claim 4, wherein stiffness of the membrane is regulated pneumatically.

7. The apparatus according to claim 1, wherein the injection openings in the mixing chamber are conically shaped with a larger diameter upstream than downstream.

8. The apparatus according to claim 7, wherein the valve members have a conical shape with a larger diameter upstream than downstream.

9. The apparatus according to claim 8, wherein the conical injection openings and the valve members' conical part in use, direct the steam and product so that streams meet at a substantially right angle.

10. The apparatus according to claim 9, further comprising a tube element having one end thereof cut at an angle such that one side of the cut end is longer than the other side, said tube being disposed coaxially around said valve member to improve the flow from said steam inlet to a portion of the annular discharge orifice furthest away from the steam inlet.

11. The apparatus according to claim 1, wherein the outlet from the mixing chamber is in fluid communication with a central and axial bore in one of the valve members.

12. A process for steam treating a fluid product which comprises
   injecting steam into a mixing chamber in an apparatus for steam treating a fluid product through a steam injection opening in said mixing chamber, in which steam injection opening a first valve member is disposed;
   injecting a fluid product into said mixing chamber through a product injection opening in said mixing chamber, in which product injection opening a second valve member is disposed, the position of said first and said second valve members determining the size of a substantially annular discharge orifice around each valve member, said discharge orifices facing one another;

treating said fluid product with said steam by contact therebetween within said mixing chamber;

permitting movement of the second valve member in response to the pressure in the product inlet by means of pressure sensitive displacement means, and discharging the treated product through an outlet in the mixing chamber.

13. The process according to claim 12 wherein the steam and product are directed to meet at a substantially right angle.

14. The process according to claim 12 wherein the product comprises over 20% starch.

15. The process according to claim 12 wherein the pressure in the mixing chamber is regulated by controlling the discharge using an outlet back pressure valve.

16. The process according to claim 12 wherein the temperature of the treated product is regulated by changing the size of the steam inlet opening.

17. The process according to claim 12 wherein the steam injection is provided with substantially constant pressure over the entire periphery of the annular discharge orifice.

18. The process according to claim 13 wherein the steam and product inlets are each positioned at substantially 45° angles with respect to the vertical so as to allow the steam and product to meet at the substantially right angle.

* * * * *